United States Patent [19]

Goto et al.

[11] Patent Number: 5,293,031
[45] Date of Patent: Mar. 8, 1994

[54] MAGNETIC BAR CODE READING SYSTEM EMPLOYING PHASE-SHIFT TYPE SENSOR HAVING PLURAL SENSING SECTIONS

[75] Inventors: Atsutoshi Goto; Wataru Ichikawa; Eiichi Hirai, all of Tokyo, Japan

[73] Assignee: Atsutoshi Goto, Tokyo, Japan

[21] Appl. No.: 670,822

[22] Filed: Mar. 18, 1991

[51] Int. Cl.$^5$ .................. G06K 7/08; G06K 19/06; G11B 5/17
[52] U.S. Cl. .................. 235/449; 235/494; 360/121; 360/123
[58] Field of Search .............. 235/449, 450, 435, 493, 235/494; 360/439, 121, 119, 123, 131

[56] References Cited

U.S. PATENT DOCUMENTS

| | | | |
|---|---|---|---|
| 3,290,487 | 12/1966 | Scott | 235/450 |
| 3,453,419 | 7/1969 | Torrey | 235/494 X |
| 3,598,968 | 8/1971 | Victor | 235/449 X |
| 3,626,160 | 12/1971 | Hagopian | 235/449 |
| 3,731,085 | 5/1973 | Bostron | 235/61.11 |
| 3,790,754 | 2/1974 | Black et al. | 235/61.7 |
| 3,949,193 | 4/1976 | Dowdell | 235/449 |
| 3,986,205 | 10/1976 | Fayling | 360/2 |
| 4,130,242 | 12/1978 | Mannion | 235/450 |
| 4,134,538 | 1/1979 | Lagarde et al. | 235/449 |
| 4,281,242 | 7/1981 | Mannion | 235/449 |
| 4,581,525 | 4/1986 | Horstmann | 235/493 |
| 4,649,447 | 3/1987 | Huang et al. | 360/113 |
| 4,734,643 | 3/1988 | Buberick et al. | 324/232 |
| 4,878,140 | 10/1989 | Gill et al. | 360/113 |
| 4,883,949 | 11/1989 | Kokubo . | |
| 4,906,988 | 3/1990 | Copella | 235/440 |

FOREIGN PATENT DOCUMENTS

| | | | |
|---|---|---|---|
| 420030 | 4/1991 | European Pat. Off. | 235/449 |
| 57-59293 | 4/1982 | Japan | 235/494 |
| 2-12576 | 1/1990 | Japan | 235/493 |
| 2-297693 | 12/1990 | Japan | 235/493 |

Primary Examiner—Davis L. Willis
Assistant Examiner—Edward H. Sikorski
Attorney, Agent, or Firm—Graham & James

[57] ABSTRACT

A desired coded pattern such as a bar code is formed with two materials which are magnetically different, e.g., in permeability or conductivity. A sensor has primary coils which are excited by reference AC signals which are different in phase from each other, to produce an induced output signal. When at least one of the primary coils is moved relative to the pattern to approach the pattern, the induced signal produced in the primary coil changes in accordance with existence of a material in the pattern and the electrical phase of a composite output signal of the induced signals in the respective primary coils corresponds to the existence of the material in the pattern. By measuring the electrical phase of this induced output signal, therefore, the pattern corresponding to the existence of the material can be read on the basis of the measured data of the electrical phase. The pattern may be formed by partially changing permeability by subjecting a magnetic substance such as iron to hardening by means of laser beam in accordance with a desired pattern. By recording not only a first pattern formed in an arrangement corresponding to desired coded information but also a second pattern formed with opposite characteristics to the first pattern, reading accuracy can be improved. This second pattern can, in a separate embodiment, be formed on both sides of the first pattern.

20 Claims, 6 Drawing Sheets

MAGNETIC BAR CODE READING SYSTEM EMPLOYING PHASE-SHIFT TYPE SENSOR HAVING PLURAL SENSING SECTIONS

BACKGROUND OF THE INVENTION

This invention relates to a system for reading coded information which is expressed by a pattern such as a bar code pattern and, more particularly, to an improvement of a reading system of a type in which a pattern is formed with magnetically different materials and this pattern is read by an electromagnetic sensor.

Known in the art is a coded pattern reading method according to which a black and white bar code pattern in which light reflection property varies depending upon the black and white portions is read in an optical manner. The optical type coded pattern reading method has the disadvantage that, when reflection and permeation of light are hindered due to deposition of dust on the black and white pattern section or the reading unit, it becomes extremely difficult to detect the pattern.

The prior art optical type bar code system can be applied only to a case where an article on which a pattern should be provided is made of a material such as paper on which the pattern can be printed or an article on which a printed pattern paper can be bonded semifixedly so that it will not come off easily. It is difficult to apply this optical type bar code system to other articles. If, for example, one attempts to apply the optical type bar code system to a case where a manufacturing number should be affixed in the form of a pattern to an article made of metal such as cast iron, he will not be able to print an optical type bar code pattern on the cast iron itself. Bonding of a paper having a pattern printed on it on the cast iron article will not work because it will easily come off from such cast iron article and/or become soiled.

U.S. Pat. No. 4,883,949 proposes a magnetic type coded data reading device according to which a patterned code representation magnetic sheet is bonded to an article and coded information on the code representation magnetic sheet is read by means of a magnetic sensor employing a mutual induction coil comprising a primary coil which is excited by ac and a secondary coil which thereby generates a mutual induction voltage. According to the code representation magnetic sheet to be read by this coded data reading device, coded information can be read magnetically even when it cannot be read optically because the pattern surface is soiled with dust. In this coded data reading device, the code representation magnetic sheet which is prepared separately must be attached to the article semi-fixedly to prevent ready coming off of the sheet from the article as in the case of the optical type reading device; however, there still remains the likelihood of coming off of the magnetic sheet.

This prior art coded data reading device identifies coded information by operating an amplitude value of mutual induction voltage produced in the secondary coil of the magnetic sensor by a microcomputer or the like computing device, utilizing the phenomenon that the amplitude level of mutual induction voltage produced in the secondary coil of the mutual induction coil varies with the width, thickness and interval of a metal portion of the code representation magnetic sheet. Since, however, the amplitude value of mutual induction voltage produced in the secondary coil varies also with the distance (gap) between the code representation magnetic sheet and the mutual induction coil, a protection film is normally provided on the surface of the magnetic sheet which constitutes a guide surface for the mutual induction coil to provide a flat surface with a view to maintaining the distance constant during reading of the coded information. Accordingly, there arises the problem that, when the surface of the magnetic sheet has become uneven due to unintended deposition of paint or the like on the surface of the magnetic sheet after the magnetic sheet has been bonded to the metal material such as case iron, the distance between the magnetic sheet and the mutual induction coil is changed, with the result that accurate reading of the coded information becomes difficult. Further, since the amplitude level of the mutual induction voltage changes under the influence of an environmental change such as change in the ambient temperature, this factor also adversely affects the accuracy in reading of the coded information.

SUMMARY OF THE INVENTION

It is, therefore, an object of the invention to provide a coded information reading system capable of reading coded information accurately without being adversely affected by change in the amplitude level of an induced output signal due to the state of use or environmental change.

It is another object of the invention to propose forming, by an improved coded pattern reading method, of a desired coded pattern relatively easily without likelihood of occurrence of a trouble such as coming off of a pattern paper and without necessity for performing a troublesome processing such as machining, and thereby provide a more practicable coded information reading system.

It is still another object of the invention to propose a recording medium on which coded information is recorded in an entirely novel pattern so that the accuracy in reading of coded information can be improved.

For achieving the first object of the invention, the coded information reading system according to the invention comprises pattern recording means having a pattern formed by first and second pattern elements of mutually different magnetic characteristics in an arrangement corresponding to desired coded information; sensor means including coil means excited by a reference ac signal for producing an induced output signal, said induced output signal exhibiting electrical phase corresponding to existence of the first and second pattern elements in the pattern when said coil means has approached the pattern; and signal forming means for measuring the electrical phases of the induced output signal from said coil means and forming, in correspondence to measured data of the electrical phases, a pattern signal corresponding to the first and second pattern elements.

Since the first and second pattern elements which constitute the pattern are magnetically different from each other, the induced output signal from the coil means exhibits change corresponding to existence of the first and second pattern elements in the pattern when the coil means has approached the pattern. This change includes change in the electrical phase. For example, for producing a marked change in the electrical phase, the coil means preferably include plural primary coils which are excited by plural reference ac signals which are different in phase from each other. For another example, although the change is not so remarkable as in the case where the primary coils are excited by plural reference ac signals, change in the electrical phase can be recognized also in a case where the primary coil is excited by a single reference ac signal.

Thus, having regard to the phenomenon that the induced output signal exhibits an electrical phase corresponding to existence of the first and second materials in the pattern, the signal forming means is provided and the electrical phase of the induced output signal is measured by this signal forming means. On the basis of measured data of the electrical phase, a pattern signal corresponding to the first and second materials is formed. The pattern signal thus obtained is a signal corresponding to existence of the first and second pattern elements constituting the pattern, e.g., a square pulse signal corresponding to existence of the first and second materials. Once this pattern signal has been obtained, coded information contained in the pattern can be recognized by a proper decoding processing. By way of example, a known bar code pattern may be utilized as the coded pattern. In this case, decoding of the pattern signal is made by using a known decoding processing for a bar code pattern.

The electrical phase of the induced output signal changes only in accordance with existence of the first and second pattern elements in the pattern and is not affected by variation in the distance between the sensor means and the pattern unless the sensor means is inclined to the pattern surface, nor is the electrical phase affected by the environmental change such as change in the ambient temperature. Accordingly, coded information can be read accurately regardless of the state of use and the environmental change such as in a case where the pattern surface has become uneven due to unintended deposition of paint or the like.

By way of example, the coil means may include two primary coils which are excited by two reference ac signals which are different in phase from each other. In this case, the respective primary coils may be spaced from each other so that, when one of the primary coils approaches the pattern, the other primary coil cannot approach the pattern. By this arrangement, the amplitude level of a first induced signal which is induced by the primary coil which approaches the pattern exhibits change corresponding to the pattern and the amplitude level of a second induced signal which is induced by the other primary coil does not exhibit change corresponding to the pattern. Since the exciting signals are different in phase, the first induced signal and the second induced signal are different in phase form each other. Accordingly, an induced output signal which is a composite signal of the first and second induced signals changes in its electrical phase in accordance with the change in the amplitude level of the first induced signal and, consequently, it exhibits an electrical phase corresponding to the first and second pattern elements in the pattern (i.e., phase difference relative to the reference ac signal).

By way of example, the pattern recording means may include not only a first pattern formed by first and second pattern elements which are magnetically different from each other in an arrangement corresponding to desired coded information but also a second pattern formed by two magnetically different pattern elements and arranged with opposite characteristics to the first pattern. In this case, the coil means may include two primary coils which are excited by two reference ac signals which are different in phase from each other. These primary coils may be suitably spaced from each other so that, when one of the primary coils approaches the first pattern, the other primary coil approaches the second pattern. By this arrangement, the amplitude level of a first induced signal induced by the primary coil which approaches the first pattern exhibits a change corresponding to the pattern and the amplitude level of a second induced signal induced by the primary coil which approaches the second pattern exhibits a change which is of opposite characteristics corresponding to the second pattern. Since the phase of respective exciting signals is different, the first and second induced signals are different in the electrical phase. Accordingly, an induced output signal which is a composite signal of the first and second induced signals changes in its electrical phase to a larger degree in accordance with a differential change in the amplitude levels of the first and second induced signals and, consequently, it exhibits a larger electrical phase (phase difference relative to the reference ac signal) corresponding to existence of the first and second pattern elements in the pattern. The accuracy in measurement of electrical phase therefore is improved with resulting improvement in accuracy in reading of the pattern.

The two pattern elements which constitute the second pattern (the third and fourth pattern elements) may have opposite magnetic characteristics to the first and second pattern elements which constitute the first pattern. For example, if permeability of the first pattern elements is larger than that of the second pattern elements, permeability of the third pattern elements in the second pattern which corresponds to the first pattern element should be smaller than that of the fourth pattern element which corresponds to the second pattern element. As the third and fourth pattern elements, the same materials as the first and second pattern elements may be employed. In this case, the second pattern can be formed by arranging the first and second materials in opposite relation to the first pattern.

Any material may be used as the first and second pattern elements which constitute the pattern so long as they are magnetically different from each other. For example, as described above, permeability of one of the first and second pattern elements may be larger than that of the other pattern element. In that case, difference in reluctance is produced in accordance with difference in permeability. Alternatively, conductivity of one of the first and second pattern elements may be larger than that of the other material. In that case, difference in the manner of generation of an eddy current is produced in accordance with difference in conductivity and difference in reluctance is thereby produced. A pattern may be formed by combining permeability and conductivity. Difference in the magnetic property may be produced by differing the manner of magnetization.

One or both of the first and second pattern elements may be the same as the material of a base portion of the pattern recording means. For example, in a case where the base portion of the pattern recording means is made of a magnetic substance such as iron, permeability of the material can be changed by subjecting the base portion to a partial hardening by means of laser beam, so that this hardening method may be adopted. Alternatively, in a case where the base portion of the pattern recording means is made of a magnetic substance such as iron, a pattern may be formed by forming a projection and a depression on the surface of the magnetic substance. In this case, the first pattern element is formed by the projection of the magnetic substance and the second pattern element by the depression thereof (i.e., air or a non-magnetic substance filled in the depression). A magnetic or conductive substance may be attached partially in the form of a desired pattern to the base portion of the pattern recording means consisting of a magnetic, conductive, non-magnetic or non-conductive substance may be made by a suitable method such as partial electroplating, coating of liquid including a necessary material, printing or baking. As the pattern recording means, a metal foil or a sheet of paper to which a necessary magnetic, conductive, non-magnetic or non-conductive material is partially attached may be used.

For achieving another object of the invention, the pattern reading system according to the invention comprises: pattern recording means having a base portion made of a magnetic substance, said recording means partially changing permeability of the base portion by subjecting it to hardening by means of laser beam in accordance with a desired pattern so that the desired pattern expressed by partial difference in permeability can be recorded; sensor means having coil means which is excited by a reference ac signal to produce an induced output signal, said induced output signal representing the difference in permeability in the pattern when said coil means has approached the pattern; and signal forming means responsive to the induced output signal from said coil means for forming a pattern reading signal corresponding to the difference in permeability.

Since permeability can be changed by partial hardening by means of laser beam, a pattern corresponding to desired coded information can be easily formed, for example, with two different portions having a large permeability and a small permeability. Since this pattern is fixedly recorded in the base portion of the pattern recording means, no problem of coming off which arises in the case of bonding a magnetic sheet will never arise. Besides, a desired coded pattern can be formed relatively easily without necessity for a troublesome processing such as machining. The pattern recording means having the pattern whose permeability is changed by hardening by means of laser beam is applicable to not only the above described phase type reading system but also an amplitude level detection type reading system and hence the latter is included in the scope of the present invention.

For achieving still another object of the invention, the coded information recording medium comprises a pattern recoding surface which has, in parallel to each other, a first pattern formed by first and second pattern elements of mutually different magnetic characteristics in an arrangement corresponding to desired coded information and a second pattern formed by two pattern elements of mutually different magnetic characteristics and arranged with opposite characteristics to the first pattern.

The coded information recording medium having not only the first pattern corresponding to desired coded information but also the second pattern with opposite characteristics to the first pattern contributes to improving the reading accuracy when it is used in the above described phase type coded information reading system. This recording medium is applicable also to the amplitude level detection type reading system, so that the latter is included in the scope of the present invention.

For achieving the other object of the invention, the coded information reading system comprises: pattern reading means having a pattern formed by first and second pattern elements of mutually different magnetic characteristics in an arrangement corresponding to desired coded information; sensor means including coil means which is excited by a reference ac signal for producing an induced output signal and which has three cores in the form of projection each having a coil to produce the induced output signal, said three cores being arranged between second and third said cores and that when said first core approaches said pattern, the other cores do not approach said pattern, and said induced output signal representing the difference of materials in said pattern when said coil means has approached said pattern; and signal forming means responsive to the induced output signal from said coil means for forming a pattern reading signal corresponding to the difference of materials.

Since the coil means has three cores each having a coil such that when the first core approaches the pattern, the other coils do not approach the pattern, there is produced a superior advantage that accurate pattern reading can be achieved even when the sensor means approaches in an inclined relationship to the surface of the pattern recording means. This system is applicable not only to the aforesaid phase measurement type reading but also to the amplitude level detection type reading, without deviation from the scope of the present invention.

According to the coded information reading system of the present invention, a product management system employing a coded pattern such as a bar code pattern can be introduced in the field including cast iron and metal products in which the conventional optical bar code system cannot be introduced. More specifically, identifying information is assigned to each individual part of a finished product, this identifying information is represented by a pattern following a predetermined coding standard, and a pattern which generates reluctance change corresponding to this pattern is provided to each individual part in the manner described above. By causing the magnetic sensor to approach the portion of the part provided with the pattern during or before and after assembling of the finished product, a magnetic circuit is formed between the portion provided with the pattern and the magnetic sensor and, by detecting reluctance change corresponding to the pattern by the magnetic sensor, the pattern is read. The identifying information assigned to the part is recognized on the basis of the read pattern and is utilized for the product management such as a production management or a maintenance management.

According to the invention, in a production site such as an automobile production line where an article made of metal such as cast iron is used as a part of a finished product, identifying information such as a part identifying number, a part manufacturing number or a manufacturing number of a whole automobile body can be automatically read whereby the product management can be readily automatized or incorporated into FMS (flexible manufacturing system). In a case where identifying information concerning a finished product is assigned to a finished product in accordance with the invention, the finished product can be recognized when it has been stolen. When, for example, an automobile body number is assigned to an automobile according to the invention, it is almost impossible to alter the pattern. When, accordingly, the automobile has been stolen, the automobile can be recognized by the automobile number provided according to the invention even if the visible display portion of the body number has been fraudulently altered.

Embodiments of the invention will now be described with reference to the accompanying drawings.

BRIEF DESCRIPTION OF THE DRAWINGS

In the accompanying drawings.

DESCRIPTION OF PREFERRED EMBODIMENTS

Figure 1:
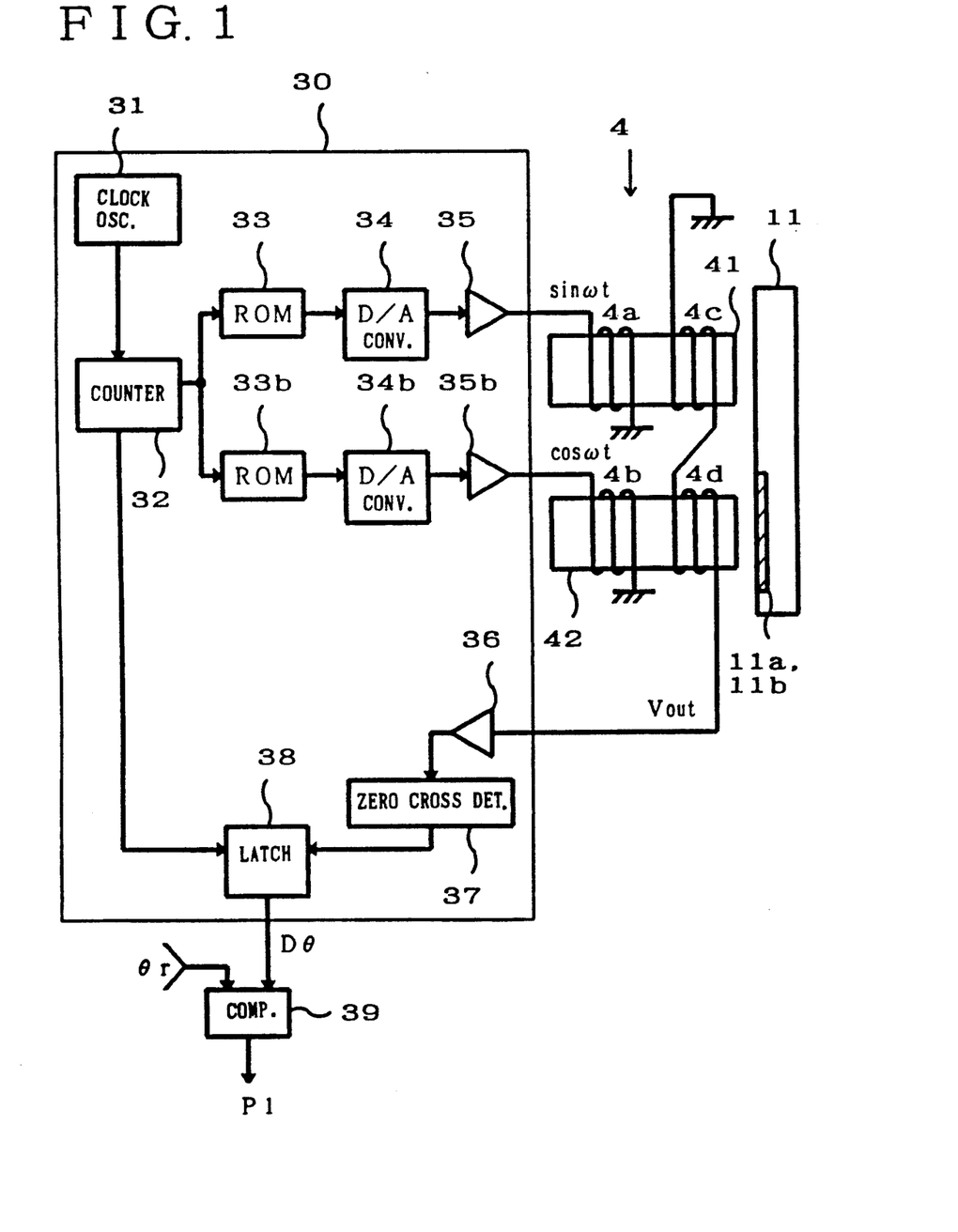
FIG. 1 is a block diagram showing an embodiment of the coded information reading system according to the invention.
Figure 2:
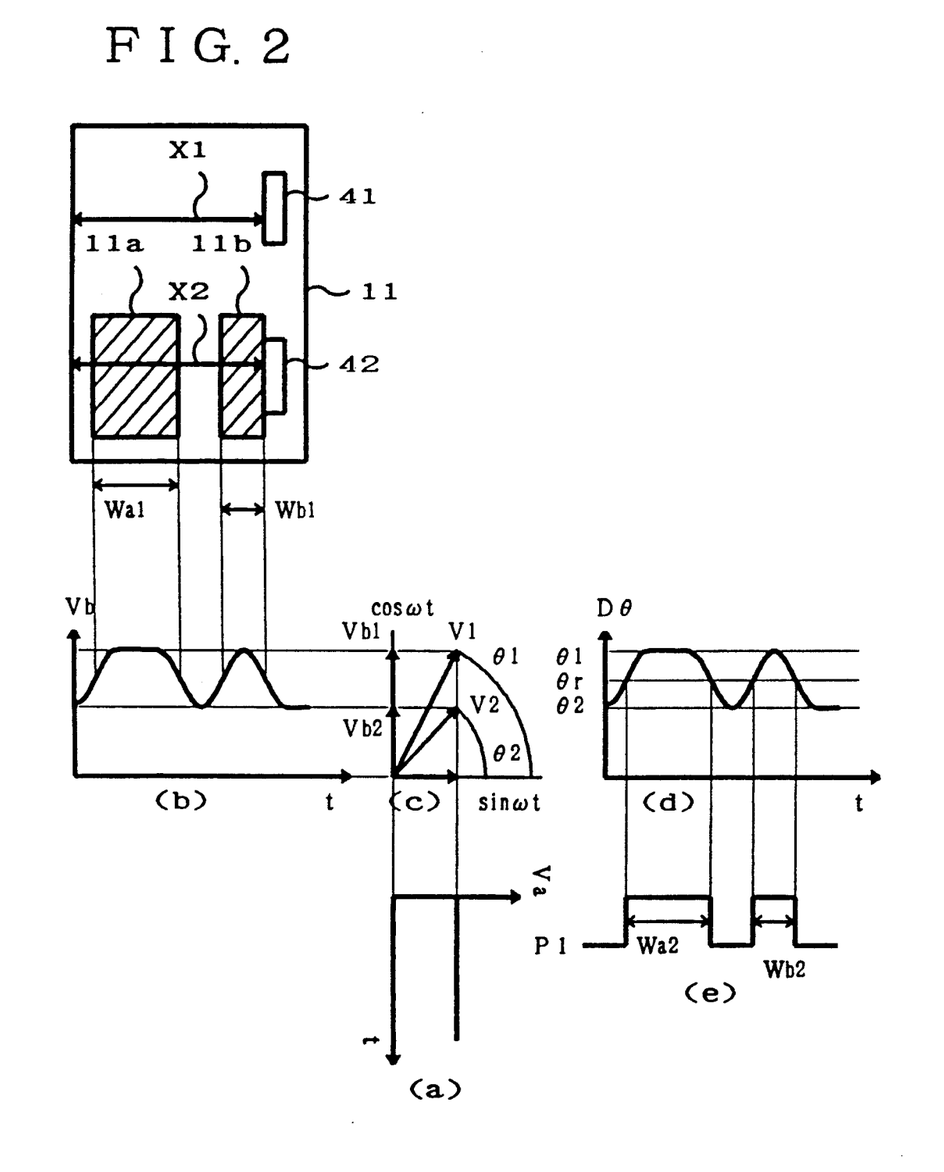
FIG. 2 is a plan view of the pattern recorded surface and a view for describing the operation of the reading system.

FIG. 1 is a block diagram showing an embodiment of the invention constructed as a bar code reading device and FIG. 2 is a diagram for describing the operation of the device.

An article 11 is a part of a finished product such as an automobile and is made, for example, of iron. Desired coded information as illustrated is provided at a predetermined position of the article 11 in the form of patterns 11a and 11b which produce reluctance change. The article 11 is shown in a side view or a sectional view in FIG. 1 and in a plan view in FIG. 2. The pattern 11a has a width Wa1 and the pattern 11b has a width Wb1.

As an example of the coded information, a known bar code pattern is utilized. The coded information may have any desired contents. For example, individual identifying information such as a manufacturing number may be assigned to the article 11 which is a part and this identifying information may be expressed by a pattern made according to a predetermined coding standard (e.g., a bar code pattern). The coded information however is not limited to individual identifying information of a part but it may be identifying information of a finished product such as an automobile body number which is expressed in the form of a pattern made according to a predetermined coding standard (e.g., a bar code).

Identifying information concerning a finished product need not be provided to all parts but it may be provided to one or more specific parts according to necessity. Likewise, identifying information of an individual part need not be provided to all parts but it may be provided to only one or more necessary parts.

Coded information patterns may be provided at a predetermined position of the article 11 by a known method in the manufacturing process of the article 11 or after completion of manufacturing thereof. For example, a necessary bar code pattern may be formed by changing permeability of the material of the article 11 at a position where the pattern is formed.

As to a magnetic substance such as iron, permeability of the substance can be changed partially by subjecting it to a partial hardening by means of radiation of laser beam. A desired bar code pattern therefore is provided to the surface of the article 11 by a partial hardening by means of laser beam. A pattern whose permeability changes according to the bar code pattern can thereby be realized. The change in permeability according to the bar code pattern means a binary change according to which a black portion of the bar code represents a larger permeability value and a white portion of the bar code represents a smaller permeability value, or vice versa.

Alternatively, a pattern may be provided by forming projections and depressions corresponding to a desired bar code pattern at a position where the pattern is to be provided in the article 11. A gap between the surface of the article 11 and a magnetic sensor changes in accordance with the configuration formed by the projections and depressions and this produces change in reluctance. The projections and depressions can be formed by any known method such as machining, etching or bonding of projections to a flat surface of the article 11. A conventional coded magnetic sheet may also be used for forming these projections and depressions.

Alternatively further, a pattern may be formed in such a manner that a mode of generation of eddy current of a conductive material (i.e., magnitude of eddy current loss) changes in accordance with a desired bar code pattern at a position where the pattern is to be formed in the article 11. In this case, the pattern exhibits a binary change in such a manner that the eddy current loss is larger in a black portion of the bar code and smaller in a white portion thereof, or vice versa. For example, a pattern may be formed by covering the article 11 made of a relatively weak conductive material partially with a relatively good conductive material (e.g., copper) in black portions of a bar code. Conversely, a pattern may be formed by covering the article 11 made of a relatively good conductive material partially with a relatively weak conductive material or non-conductive material in black portions of a bar code. Such partial covering can be realized by partial electroplating of the material to be covered or coating or printing of a liquid including necessary material.

Reading of coded information provided on the article 11 is made by approaching a magnetic sensor 4 to the portion of the article 11 where the pattern is provided in a proper stage during assembling of a finished product or before or after such assembling. The magnetic sensor 4 is a mutual induction type magnetic sensor including a core 41 wound with a primary coil 4a and a secondary coil 4c and a core 42 wound with a primary coil 4b and a secondary coil 4d.

The widths of the detecting end portions of the cores 41 and 42 are so determined that they are smaller than the minimum interval of white and black portions of the patterns 11a and 11b. For detection scanning of the patterns 11a and 11b, the detecting end portions of the cores 41 and 42 are caused to approach the article 11. More specifically, the core 41 approaches and scans a portion where there is no pattern (e.g., a portion above or below the pattern) and the core 42 approaches and scans a portion where the pattern is provided. In FIG. 2, the scanning direction of the core 41 is designated by reference character X1 and the scanning direction of the core 42 by reference character X2. By forming, for example, an integral sensor by connecting the other end portions of the cores 41 and 42 together and vertically moving this sensor relative to the pattern with a certain positional relation thereto, scanning in the X1 and X2 directions is performed.

Description will now be made about construction of a phase difference detection section 30 which detects phase difference $D\theta$ between a composite mutual induction voltage induced in the secondary coils 4c and 4d and a reference ac signal sin $\omega t$.

In FIG. 1, the phase difference detection section 30 comprises a reference signal generation section which generates reference ac signals sin $\omega t$ and cos $\omega t$ and a phase difference detection section which detects phase difference $D\theta$ between mutual induction voltages in the secondary coils 4c and 4d and the reference ac signal sin $\omega t$.

The reference signal generation section includes a clock oscillator 31, a synchronizing counter 32, ROMs 33 and 33b, D/A converters 34 and 34b and amplifiers 35 and 35b. The phase difference detection section includes an amplifier 36, a zero-cross circuit 37 and a latch circuit 38.

The clock oscillator 31 generates a high rate and accurate clock signal in response to which the other circuits of the device are operated.

The synchronizing counter 32 counts the clock signal generated by the clock oscillator 31 and supplies the count as an address signal to the ROM 33 and a latch circuit 38 of the phase difference detection section.

The ROMs 33 and 33b store amplitude data corresponding to the reference ac signal and generate amplitude data of the reference ac signal in response to the address signal from the synchronizing counter 32. The ROM 33 stores amplitude data of sin $\omega t$ and the ROM 33b stores amplitude data of cos $\omega t$. The ROMs 33 and 33b therefore provide two types of reference ac signals sin $\omega t$ and cos $\omega t$ by receiving the same address signal from the synchronizing counter 32. Two types of reference ac signals can be obtained also by accessing ROMs storing the same amplitude data by different address signals.

The D/A converters 34 and 34b convert the digital amplitude data from the ROMs 33 and 33b to analog signals and supply them to the amplifiers 35 and 35b. The amplifiers 35 and 35b amplify the analog signals from the D/A converters 34 and 34b and supply the amplified signals as the reference ac signals sin $\omega t$ and cos $\omega t$ to the primary coils 4a and 4b. Assuming that the frequency dividing number of the synchronizing counter 32 is M, MM counts of the counter 32 correspond to the maximum phase angle $2\pi$ radian (360 degrees) of the reference ac signals. In other words, one count of the synchronizing counter 32 represents a phase angle of $2\pi/M$ radian.

The amplifier 36 amplifies a composite value of the secondary voltages induced in the secondary coils 4c and 4d and supplies the amplified value to the zero-cross circuit 37. The zero-cross circuit 37 detects a zero-cross point from a negative voltage to a positive voltage in response to the mutual induction voltage (secondary voltage) induced in the secondary coils 4c and 4d of the magnetic sensor 4 and supplies a detection signal to the latch circuit 38. The latch circuit 38 latches a count of the synchronizing counter 32 which has started with a clock signal at the rise of the reference ac signals at a time point of generation of the detection signal from the zero-cross detection circuit 37 (zero-cross point). The value latched by the latch circuit 38 therefore constitutes phase difference $D\theta$ between the reference ac signal and the mutual induction voltage (composite secondary output).

Referring to FIG. 2, the operation of this embodiment will be described.

The primary coil 4a of the core 41 is excited by the reference ac signal (sin $\omega t$) from the amplifier 35 and the primary coil 4b of the core 42 is excited by the reference ac signal (cos $\omega t$) from the amplifier 35b. In other words, the primary coils 4a and 4b are excited by ac signals of phase difference $\pi/2$ (90 degrees). The end portions of the cores 41 and 42 are caused to approach the article 11 and perform scanning in the horizontal direction. Since there is no pattern in the scanning route X1 of the core 41, a mutual induction voltage Va of a constant amplitude shown in FIG. 2(a) is induced in the secondary coil 4c of the core 41.

On the other hand, there are the patterns 11a and 11b having different widths in the scanning route X2 of the core 42 and, accordingly, magnetic circuits having reluctances corresponding to the patterns 11a and 11b are formed between the core 42 and the article 11 and a mutual induction voltage Vb whose amplitude changes in accordance with reluctance change as shown in FIG. 2(b) is induced in the secondary coil 4d of the core 42. The maximum value of the mutual induction voltage Vb is designated by Vb1 and the minimum value thereof by Vb2.

Since the secondary coils 4c and 4d of the cores 41 and 42 are connected in series, a composite secondary voltage Vout of the mutual induction voltages Va and Vb appears in the secondary coils 4c and 4d and this composite secondary voltage Vout is supplied to the zero-cross circuit 37 through the amplifier 36. A vector representation of this state is shown in FIG. 2(c). Since the reference ac signal in the core 41 at this time is sin $\omega t$ and the reference ac signal in the core 42 is cos $\omega t$, the composite secondary voltage Vout has a certain phase difference with respect to the reference ac signal of the core 41 (sin $\omega t$). Assuming that the composite secondary voltage Vout generated when the mutual induction voltage Vb of the secondary coil 4d is at the maximum value Vb1 is designated by V1, the phase difference is $\theta 1$ in the figure and, assuming that the composite secondary voltage Vout generated when the mutual induction voltage Vb is at the minimum value Vb2 is designated by V2, the phase difference is $\theta 2$ in the figure.

The phase difference $\theta 1$ is phase difference between the composite secondary voltage Vout=V1 generated when the core 42 is located in the middle of the patterns 11a and 11b whereby the largest mutual induction voltage Vb1 has been generated in the secondary coil 4d, and the reference ac signal (sin $\omega t$). The phase difference $\theta 2$ is phase difference between the composite secondary voltage Vout=V2 generated when the core 42 is located in the portion where there are no pattern 11a or 11b and the mutual induction voltages Va and Vb2 of the same magnitude have been generated in the secondary coil 4c of the core 41 and the secondary coil 4d of the core 42, and the reference ac signal (sin $\omega t$). Since the mutual induction voltage Va induced in the secondary coil 4c of the core 41 is of the same magnitude as the mutual induction voltage Vb induced in the secondary coil 4d of the core 42, the phase difference θ2 is 45 degrees.

The latch circuit 38 thereby produces a phase difference signal Dθ which varies as the magnetic sensor 4 is moved horizontally. This phase difference signal Dθ is compared with a predetermined reference value θr by a comparison section 39 and the result of comparison is provided as a pulse signal P1 as shown in FIG. 2(e). When, for example, Dθ≧θr, P1=1 is produced and when Dθ<θr, P1=0 is produced. This pulse signal P1 is a signal having pulse intervals Wa2 and Wb2 corresponding to variation in the phase difference signal Dθ. By detecting these pulse intervals, the intervals Wa1 and Wb1 of the patterns 11a and 11b can be recognized and the coded information can be read.

Since, as described above, phase difference between the composite value of mutual induction voltages of the primary coil and secondary coil excited by reference ac signals of different reference ac signals is detected in the above described embodiment, the phase difference can be accurately detected notwithstanding change in the distance between the magnetic sensor 4 and the article 11 and the bar code pattern can thereby be read.

Figure 7:
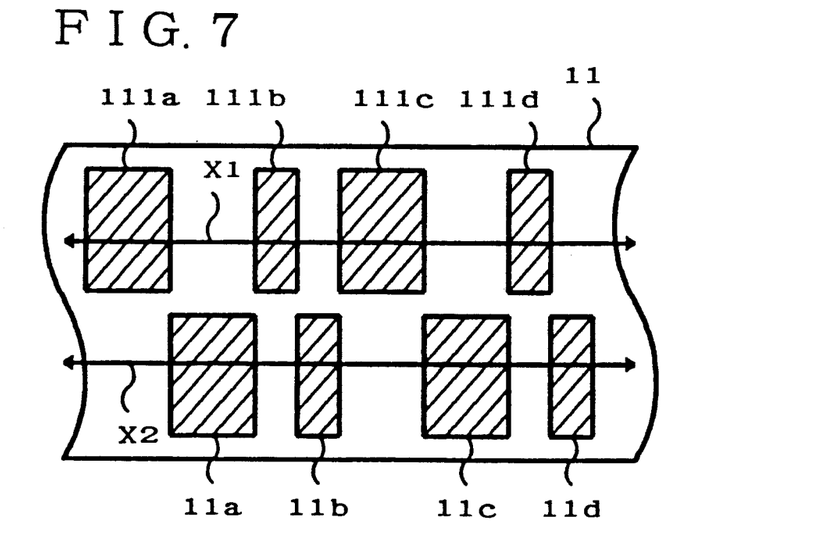
FIG. 7 is a plan view showing a modified example of a coded information pattern and FIG. 8 is a plan view showing another modified example of a coded information pattern.

In the embodiment shown in FIG. 1, there is no pattern in the scanning route X1 of the core 41. Alternatively, as shown in FIG. 7, patterns 111a, 111b and 111c which are opposite to patterns 11a, 11b and 11c of the scanning route X2 of the core 42 may be provided so that the cores 41 and 42 may scan patterns which are opposite to each other. By this arrangement, the phase difference signal Dθ is provided with an amplitude which is about double that of the embodiment in FIG. 1 whereby detection of the patterns can be facilitated.

Figure 3:
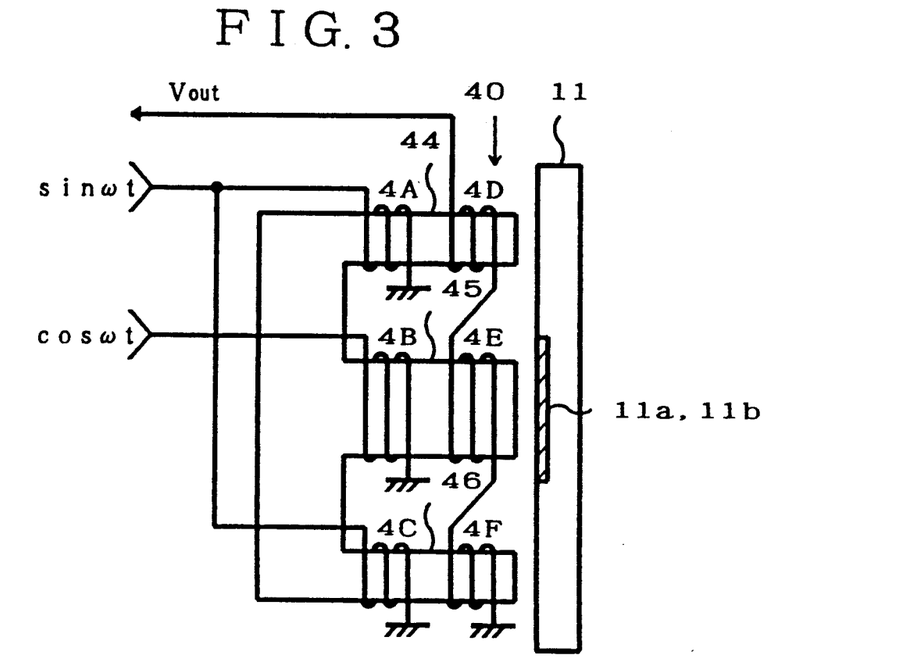
FIG. 3 is a schematic side view of a modified example of a magnetic sensor used in the above embodiment.

FIG. 3 shows a modified example of the magnetic sensor 4. In FIG. 3, the same component parts as those in FIG. 1 are designated by the same reference characters and description thereof will be omitted.

A magnetic sensor 40 is a mutual induction type magnetic sensor including a core 44 wound with a primary coil 4A and a secondary coil 4D, a core 45 wound with a primary coil 4B and a secondary coil 4E, and a core 46 wound with a primary coil 4C and a secondary coil 4F.

Figure 8:
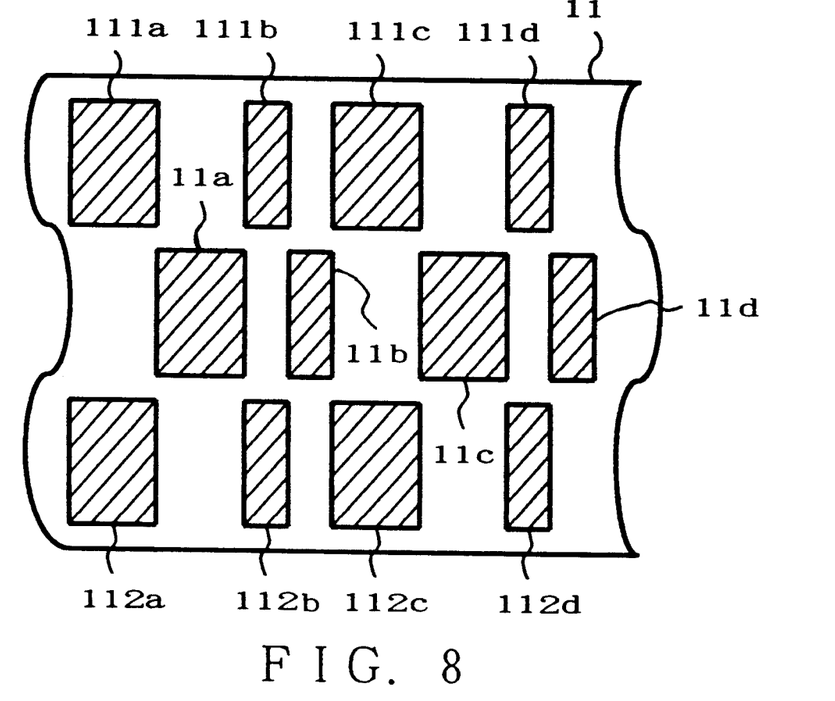

The reference ac signal sin ωt is supplied to the primary coils 4A and 4C of the cores 44 and 46 and the reference ac signal cos ωt is supplied to the primary coil 4B of the core 45. The cross sectional area of each of the cores 44 and 46 (i.e., area facing the article 11) is half that of the core 45. Therefore, the secondary coils 4D and 4F of the cores 44 and 46 are equivalent to the secondary coil 4c of the core 41 of FIG. 1. In a case where the opposite pattern train 111a, 111b, 111c, ... as shown in FIG. 7 is provided, this opposite pattern train is provided on both above and below the normal pattern train 11a, 11b, 11c, ... i.e., on the cores 44 and 46. FIG. 8 shows an example of such opposite pattern trains 111a, 111b, 111c ... and 112a, 112b, 112c ... on both sides.

In the case of the magnetic sensor of FIG. 1, when the magnetic sensor 4 itself is inclined, the distances between the cores 41 and 42 and the article 11 become different from each other and accurate detection of the phase difference becomes difficult. According to the magnetic sensor 40 of FIG. 3, even when the sensor 40 is inclined, the cores 44 and 46 on both sides cancel the change in the distance due to the inclination of the magnetic sensor 40 and thereby make a compensation as if the distances between the cores 44, 46 and the article 11 were always the same, so that accurate detection of the phase difference is ensured.

Figure 4:
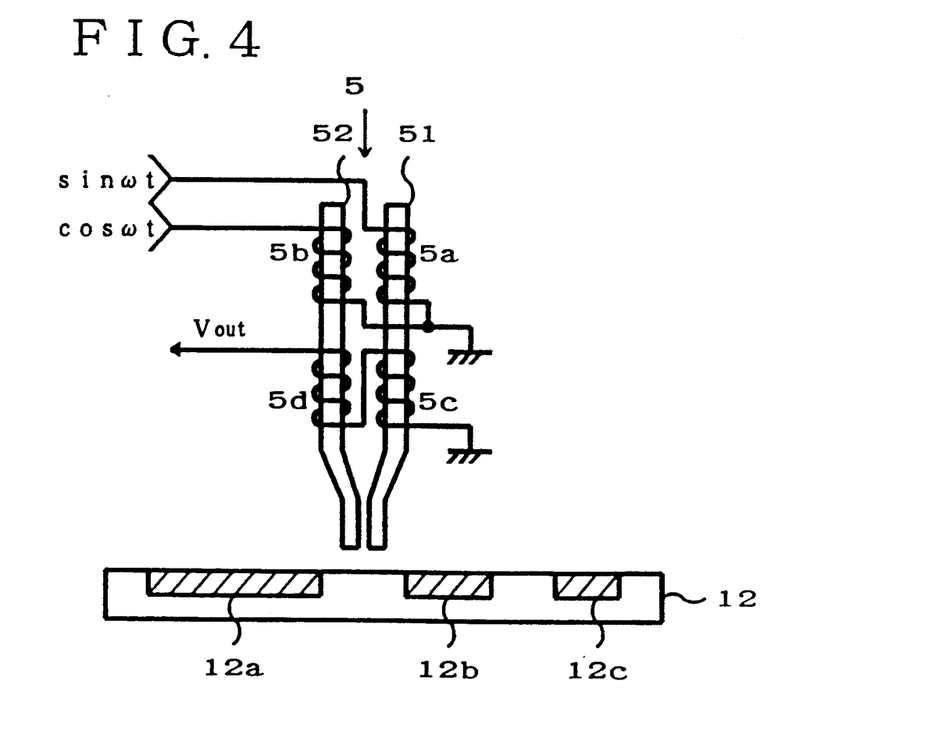
FIG. 4 is a schematic side view showing another embodiment of the coded information reading system according to the invention particularly in the portion including the magnetic sensor.
Figure 5:
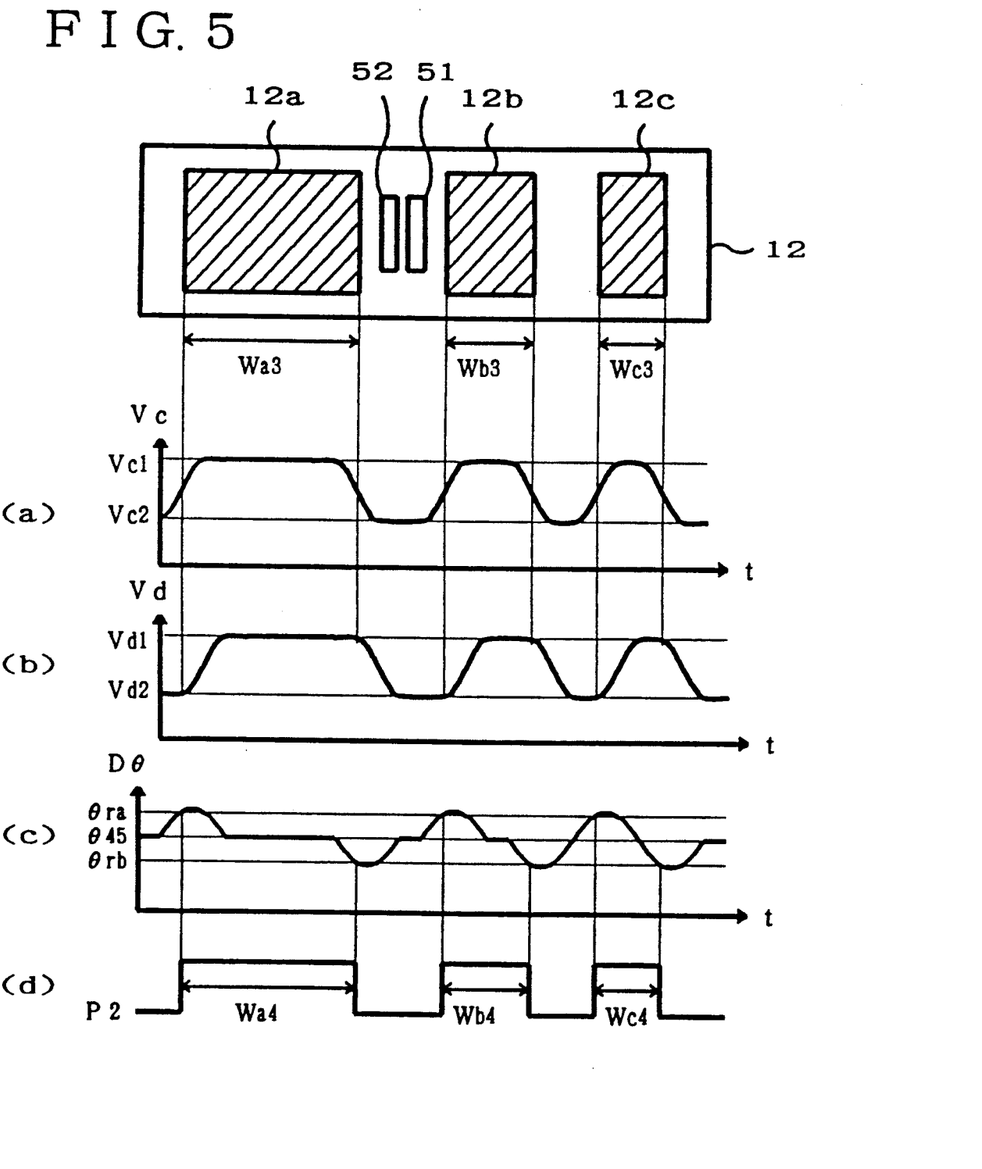
FIG. 5 is a plan view of the pattern recorded surface and a view for describing the operation of the reading system in the same embodiment.

FIGS. 4 and 5 show another embodiment of the coded information reading device according to the invention. FIG. 4 shows the entire construction of the magnetic sensor of the coded information reading device and FIG. 5 is a diagram for describing the operation of the reading device.

An article 12 is of the same structure as the article 11 of FIG. 1 and is provided in predetermined positions thereof with patterns 12a, 12b and 12c which produce reluctance changes. The pattern 12a has a width Wa3, the pattern 12b has a width Wb3 and the pattern 12c has a width Wc3.

A magnetic sensor 5 is a mutual induction type magnetic sensor and includes a core 51 wound with a primary coil 5a and a secondary coil 5c and a core 52 wound with a primary coil 5b and a secondary coil 5d. In the magnetic sensor 4 of FIG. 2, the cores 41 and 42 are disposed vertically with respect to the scanning direction whereas in the magnetic sensor 5, the cores 51 and 52 are disposed along the scanning direction.

The interval between the cores 51 and 52 in the scanning direction is so determined that it is smaller than the minimum interval of black and white portions of the patterns 12a, 12b and 12c. The widths of the cores 51 and 52 should preferably be less than half the minimum interval of the black and white portions of the patterns 12a, 12b and 12c and be the same as each other.

In the embodiment of FIG. 4, a phase difference detection section 30 and a comparison section 39 may be of the same construction as those of FIG. 1 so that description thereof will be omitted.

Referring to FIG. 5, the operation of this embodiment will be described.

The primary coil 5a of the core 51 is excited by the reference ac signal sin ωt from the amplifier 35 and the primary coil 5b of the core 52 is excited by the reference ac signal cos ωt of the amplifier 35b. In other words, the primary coils 5a and 5b are respectively excited by the reference ac signals having a phase difference π/2 (90 degrees).

The end portions of the cores 51 and 52 are caused to approach the article 12 and perform scanning in the horizontal direction. Since the core 51 forms a magnetic circuit with the patterns 12a, 12b and 12c along the scanning route always prior to the core 52, the amplitude change in mutual induction voltage Vc induced in the secondary coil 5c of the core 51 is always in advance of mutual induction voltage Vd induced in the secondary coil 5d of the core 52. In other words, a time point at which the mutual induction voltage Vc changes from a minimum value Vc2 to a maximum value Vc1 and a time point at which the voltage Vc changes from the maximum value Vc1 to the minimum value Vc2 always appears prior to a time point at which the mutual induction voltage Vd changes from a minimum value Vd2 to a maximum value Vd1 and a time point at which the voltage Vd changes from the maximum value Vd1 to the minimum value Vd2.

Since the cores 51 and 52 are connected in series, a composite secondary voltage of the mutual induction voltages Vc and Vd of the secondary coils 5c and 5d appears in the secondary coils 5c and 5d and this composite secondary voltage is supplied to a zero-cross circuit 37. At this time, the reference ac signal in the core 51 is sin ωt and the reference ac signal in the core 52 is cos ωt and, accordingly, the composite secondary voltage has a phase difference with respect to the reference ac signal sin ωt.

The change in the phase difference θ is produced when the cores 51 and 52 cross the borders of the patterns 12a, 12b and 12c and the mutual induction voltages Vc and Vd of the secondary coils 5c and 5d respectively increase or decrease. When the magnitudes of the mutual induction voltages Vc and Vd are the same, the phase difference θ is 45 degrees as will be understood from the vector diagram of FIG. 2(c). When the mutual induction voltages Vc and Vd respectively increase, the phase difference θ exceeds 45 degrees and then returns to 45 degrees again. Similarly, when the mutual induction voltages Vc and Vd respectively decrease, the phase difference θ becomes below 45 degrees and then returns to 45 degrees. Accordingly, the phase difference D oscillates up and down from 45 degrees as shown in FIG. 5(c).

A latch circuit 38 produces a phase difference signal Dθ which changes as the magnetic sensor 5 is moved horizontally. Since this phase difference signal Dθ is a signal oscillating up and down as shown in FIG. 5, this phase difference signal Dθ is compared with predetermined reference values θra and θrb by the comparison section 39 and the result of comparison is provided as a pulse signal P2. In this case, the comparison section 39 is composed of suitably combined comparator and flip-flops so that when Dθ≧θra, P2 will be set to 1 and, when Dθ≧θrb, P2 will be reset to 0. This pulse signal P2 is a signal having pulse intervals Wa4, Wb4 and Wc4 corresponding to variation in the phase difference signal Dθ as shown in FIG. 5(d). By detecting these pulse intervals, the intervals Wa3, Wb3 and Wc3 of the patterns 12a, 12b and 12c can be recognized and the coded information can thereby be read.

According to the above described embodiment, the phase difference between the reference ac signal and a composite value of mutual induction voltages of the secondary coils produced by the primary coils which are excited by reference ac signals of different phases id detected, so that the phase difference can be accurately detected and the bar code pattern can be read even if the distance between the magnetic sensor 5 and the article 12 changes.

In the above embodiment, description has been made about the case where two cores are provided in the magnetic sensor. The phase difference can however be detected even when there is only one core in the magnetic sensor. An embodiment thereof will be described below with reference to FIG. 6.

Figure 6:
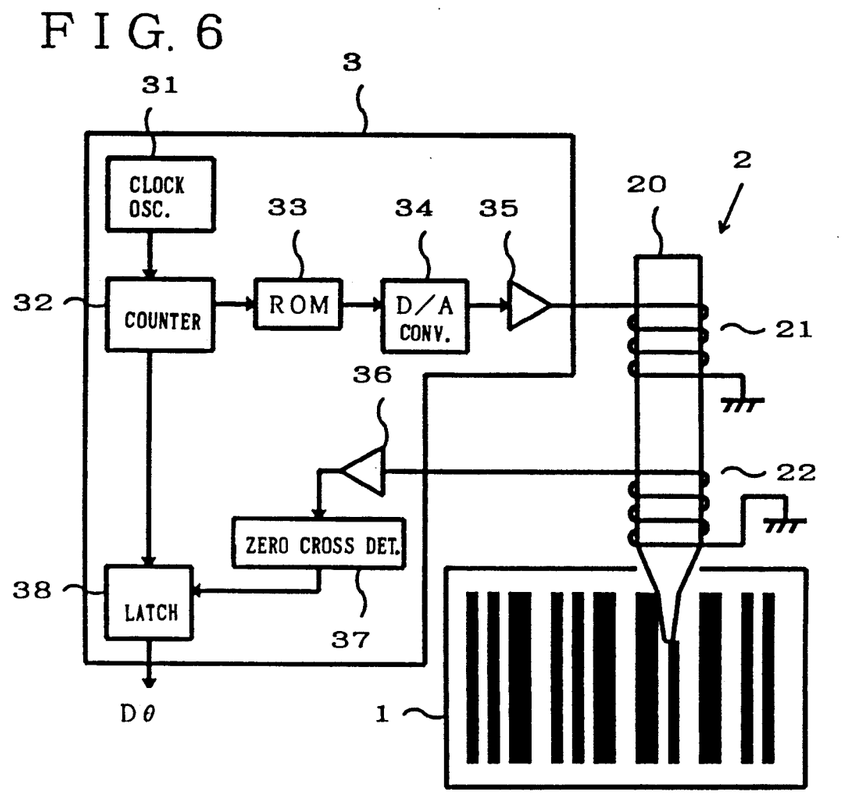
FIG. 6 is a block diagram showing still another embodiment of the coded information reading system according to the invention.

A magnetic sensor 2 is a mutual induction type magnetic sensor having a single core 20 wound with a primary coil 21 and a secondary coil 22. The core 20 is tapered in its end portion proximate to a portion of an article 1 in which a pattern is provided. The width of the tapered end portion of the core 20 is smaller than the minimum interval of black and white portions of the bar code pattern. The primary coil 21 is excited by a reference ac signal (sine wave or cosine wave). The end portion of the core 20 is caused to approach the portion of the article 1 provided with the pattern. A magnetic circuit having reluctance corresponding to the bar code pattern is formed between the portion of the article 1 provided with the pattern and the magnetic sensor 2 and reluctance change appears as mutual induction voltage in the secondary coil 22. Since the mutual induction voltage appearing in the secondary coil 22 is a signal which is delayed in phase from the reference ac signal, the reluctance change, i.e., the bar code pattern, can be read in this embodiment by detecting the phase difference between the mutual induction voltage of the secondary coil 22 and the reference ac signal.

More specifically, mutual induction voltage (secondary voltage) which is different in phase from the reference ac signal in the primary coil 21 is produced in the secondary coil 22 in accordance with reluctance change in the bar code pattern. Accordingly, the bar code pattern can be read by detecting the phase difference Dθ between the reference ac signal in the primary coil 21 and the mutual induction voltage (secondary voltage) induced in the secondary coil 22 by the phase difference detection section and extracting a binary pulse signal corresponding to the bar code pattern on the basis of the detected phase difference Dθ.

In the above described embodiment, it is necessary to cause the bar code pattern to be scanned horizontally for enabling reading of a continuous bar code. This scanning can be made by moving the hand holding the magnetic sensor, automatically moving the core within a casing of a magnetic sensor, or fixing the magnetic sensor which is positioned close to an article and moving the article.

The binary bar code pattern signal which has thus been read is applied to an unillustrated recognition circuit where coded information corresponding to the pattern, i.e., individual identifying information assigned to a part of an article or identifying information of a finished product, is recognized. The recognized information can be suitably utilized such, for example, as product management including manufacturing management or maintenance management of each individual part or a finished product.

As described above, according to the invention, identifying information such as a part identifying number or a manufacturing number affixed to a part of a finished product or a manufacturing number of a whole automobile body can be automatically read in a production site such as an automobile production line where an article made of metal, e.g., cast iron, is used as a part. Automation of product management or incorporating of product management in FMS (flexible manufacturing system) can therefore be facilitated by supplying the automatically read identifying information to a control device such as a computer.

In a case where the identifying information is one for a finished product, the information can be utilized for identifying an individual article when it has been stolen. By providing, for example, an automobile body with an automobile body number according to the invention, it is almost impossible to alter the pattern. Accordingly, when the automobile has been stolen, the stolen automobile will be identified by the automobile body number provided according to the invention even if a visibly displayed portion of the automobile body number is fraudulently altered.

The coding standard for the pattern is not limited to a bar code but other types of patterns may also be used. The pattern need necessarily be attached directly to the article but a metal piece, metal foil or paper on which the pattern is provided may be bonded to the article. In the above described embodiment, description has been made about the case where the magnetic sensor is used for scanning. Alternatively, plural magnetic sensors may be used and phase difference signals provided by these magnetic sensors may be sequentially scanned. In the above described embodiment, when the phase difference between the reference ac signal and the mutual induction voltage is relatively small, such small phase difference can be detected easily by adopting a resonance circuit or adopting a bridge circuit in a resonance circuit.

What is claimed is:

1. A coded pattern information reading system comprising:
   a recorded pattern formed by first and second pattern elements which are provided in an arrangement corresponding to desired coded information and exhibit different reluctance characteristics,
   sensor means including plural sensing sections each having coil means excited by respective ac signals different in phase from each other, said sensing sections being spaced from each other by a predetermined distance so as to face said pattern in different positional relationship thereto when the sensor means is caused to scan across the pattern, wherein a reluctance change is produced in a magnetic path through at least one of the sensing sections in accordance with the presence of the first and second pattern elements and the sensor means produces a composite induced output signal of the sensing sections having an electrical phase reflecting the reluctance change; and
   signal forming means for measuring the electrical phase of the composite induced output signal from said sensor means and forming, in correspondence to the measured electrical phase, a pattern signal determining information represented by the pattern.

2. A coded information reading system as defined in claim 1 wherein said sensing sections are disposed in a spaced relationship to each other in a direction substantially perpendicular to a scanning direction, wherein the pattern is scanned with one sensing section adjacent the pattern to transverse a path including the pattern and another sensing section spaced from the pattern to traverse a path not including the pattern.

3. A coded information reading system as defined in claim 1 wherein said pattern is comprised of first and second parallel patterns each having first and second pattern elements, wherein the relationship of reluctance characteristics between the first and second pattern elements of the first pattern is opposite to that between the first and second pattern elements of the second pattern, and wherein the pattern is scanned so that one sensing section traverses a path including the first pattern and another sensing section traverses a path including the second pattern.

4. A coded information reading system as defined in claim 1 wherein said sensing sections include first and second sensing sections which are excited by first and second reference ac signals which are different in phase from each other and a third sensing section which is excited by the second reference ac signal,
   wherein said second and third sensing sections are disposed on both sides of the first sensing section and the sensing sections spaced from one another such that when the sensor means scans the pattern the first sensing section is adjacent to the pattern and traverses a path including the pattern and the second and third sensing sections are spaced from the pattern and traverse paths on opposite sides of the pattern.

5. A coded information reading system as defined in claim 1 wherein said sensor means has said plural sensing sections which are spaced from each other in a scanning direction.

6. A coded information reading system as defined in claim 1 wherein said pattern is made in the form of a bar code pattern.

7. A coded information reading system as defined in claim 1 wherein permeability of one of the first and second pattern elements is larger than permeability of the other.

8. A coded information reading system as defined in claim 1 wherein conductivity of one of the first and second pattern elements is larger than conductivity of the other.

9. A coded information reading system as defined in claim 1 wherein said first and second pattern elements are magnetized and are different in their magnetic characteristic from each other.

10. A coded information reading reading system as defined in claim 1 wherein said recorded pattern has a base portion made of a predetermined material, one of the first and second pattern elements is said predetermined material of the base portion, and the other of the first and second pattern elements is another material which is attached to the base portion.

11. A coded information reading system as defined in claim 1 wherein said recorded pattern has a base portion made of a magnetic substance having a permeability which has been partially changed in accordance with the pattern so that the first and second pattern elements are formed.

12. A coded information reading system as defined in claim 1 wherein said signal forming means includes means for measuring an electrical phase difference of the composite induced output signal with respect to a predetermined one of said ac signals and second means for forming the pattern signal by comparing the measured phase difference with predetermined reference phase difference data.

13. A coded information reading system as defined in claim 12 further comprising third means for decoding, in correspondence to the pattern signal, the coded information corresponding to the pattern which has been scanned by the sensor means.

14. A coded pattern information reading system as defined in claim 1 wherein
   said recorded pattern includes a first pattern and second and third patterns each having first and second pattern elements and being recorded at both sides of said first pattern in parallel to said first pattern, said second pattern being formed of first and second pattern elements which exhibit different reluctance characteristics and which have a reluctance relationship opposite to the reluctance relationship between said first and second pattern elements of said first pattern, said third pattern being formed with the same reluctance relationship as said second pattern,
   said sensing sections comprises first and second sensing sections which are excited by first and second reference ac signals different in phase from each other, and
   said sensor means further comprises a third sensing section which is excited by the second reference ac signal,
   said second and third sensing sections are disposed at both sides of the first sensing section, and said first, second and third sensing sections are spaced from each other in such a manner that, when said sensor means scans the pattern, the first sensing section traverses a path including the first pattern while the second and third sensing sections traverse paths including the second and third patterns, respectively.

15. A coded information recording medium comprising:
a pattern recording surface medium comprising:
a pattern recording surface which has a first pattern formed of first and second pattern elements which are provided in an arrangement representing an entire coded information and which exhibit different reluctance characteristics, and a second pattern parallel to said first pattern, said second pattern being formed of first and second pattern elements which exhibit different reluctance characteristics and which are provided in an arrangement having a reluctance relationship opposite to the arrangement of said first and second pattern elements of said first pattern, wherein said pattern is a bar code pattern, and wherein said pattern recording surface has said second pattern on one side of the first pattern and a third pattern which is the same as the second pattern on the other side of the first pattern.

16. A pattern reading system comprising:
an object having a main body which has at least one part thereof formed of a magnetic portion, and a recording area located at a predetermined portion of said magnetic portion, said recording area having a surface partially hardened to integrally include a desired pattern on the basis of permeability difference which depends on presence or absence of hardening on the surface,
scanning means for scanning said pattern, said scanning means having sensor means displaceable relative to said pattern for scanning the same, said sensor means having coil means which is excited by a reference ac signal to produce an induced output signal, said induced output signal representing the difference in permeability in the pattern when said coil means is positioned to be affected by the pattern; and
signal forming means responsive to the induced output signal from said coil means for forming a pattern signal representing the pattern in correspondence with the difference in permeability.

17. A pattern reading system as defined in claim 16 wherein said pattern is a bar code pattern.

18. A coded pattern information reading system comprising:
a recorded pattern having first and second patterns in parallel to each other, said first pattern being formed of first and second pattern elements which are provided in an arrangement representing an entire coded information and which exhibit different reluctance characteristics, said second pattern being formed of first and second pattern elements which exhibit different reluctance characteristics and which are provided in an arrangement having a reluctance relationship opposite to the arrangement of said first and second pattern elements of said first pattern;
scanning means for scanning said patterns by approaching said pattern recording means, said scanning means having sensor means displaceable relative to said patterns for scanning the same, said sensor means having first and second sensing sections excited by an ac signal to produce an induced output signal, said sensing sections being spaced from each other in a direction substantially perpendicular to a direction in which said sensor means scans the pattern, in such manner that, when scanning the pattern, the first sensing section approaches the first pattern while the second sensing section approaches the second pattern, whereby said induced output signal is produced in correspondence with said pattern; and
signal forming means responsive to the induced output signal from said sensor means for forming a signal determining information represented by said pattern.

19. A coded pattern information reading system comprising:
a recorded pattern including at least a first pattern, said first pattern being formed of first and second pattern elements which are provided in an arrangement representing an entire coded information and which exhibit different reluctance characteristics;
scanning means for scanning said pattern by approaching said pattern, said scanning means having sensor means displaceable relative to said pattern for scanning the same, said sensor means having first, second and third sensing sections each excited by an ac signal to produce an induced output signal, said second and third sensing sections being disposed at both sides of the first sensing section and said first, second and third sensing sections being spaced from each other in such a manner that, when said sensor means scans the pattern, the first sensing section is adjacent the first pattern while the other sensing sections are not; and
signal forming means responsive to the induced output signal from said sensor means for forming a signal determining information represented by said pattern.

20. A coded pattern information reading system as defined in claim 19 wherein said pattern further includes second and third patterns recorded at both sides of said first pattern in parallel to said first pattern, said second pattern including first and second pattern elements which exhibit different reluctance characteristics and which are provided in an arrangement having a reluctance relationship opposite to the arrangement of said first and second pattern elements of said first pattern, said third pattern being formed in the same manner as said second pattern, said second and third sensing sections being adjacent said second and third patterns respectively when said first sensing section is adjacent said first pattern.

* * * * *